(12) United States Patent
Belmonte et al.

(10) Patent No.: US 10,072,729 B2
(45) Date of Patent: Sep. 11, 2018

(54) BALANCING DEVICE AND METHOD

(71) Applicant: SAFRAN AIRCRAFT ENGINES, Paris (FR)

(72) Inventors: Olivier Belmonte, Perthes en Gatinais (FR); Lucie Galons, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 614 days.

(21) Appl. No.: 14/670,227

(22) Filed: Mar. 26, 2015

(65) Prior Publication Data

US 2015/0198221 A1 Jul. 16, 2015

Related U.S. Application Data

(62) Division of application No. 12/876,716, filed on Sep. 7, 2010, now Pat. No. 9,017,016.

(30) Foreign Application Priority Data

Sep. 8, 2009 (FR) ...................... 09 56119

(51) Int. Cl.
*F16F 15/34* (2006.01)
*F01D 5/02* (2006.01)
*F16F 15/32* (2006.01)
*G01M 1/04* (2006.01)
*G01M 1/34* (2006.01)

(52) U.S. Cl.
CPC .............. *F16F 15/34* (2013.01); *F01D 5/027* (2013.01); *F16F 15/322* (2013.01); *G01M 1/04* (2013.01); *G01M 1/34* (2013.01); *Y10T 29/49948* (2015.01)

(58) Field of Classification Search
CPC ......... F01D 5/027; F16F 15/322; F16F 15/34; G01M 1/04; G01M 1/34
USPC .......................................................... 73/468
See application file for complete search history.

(56) References Cited

U.S. PATENT DOCUMENTS

| 341,146 | A | | 5/1886 | Howes |
| 3,960,047 | A | | 6/1976 | Liffick |
| 4,645,422 | A | * | 2/1987 | Brushaber .............. B63H 23/34 411/910 |
| 4,872,817 | A | * | 10/1989 | De Kruif ................ F01D 5/025 416/244 A |
| 4,879,792 | A | | 11/1989 | O'Connor |
| 4,887,949 | A | | 12/1989 | Dimmick et al. |
| 5,767,403 | A | | 6/1998 | Kopp et al. |
| 6,102,488 | A | | 8/2000 | Wilson |
| 6,290,445 | B1 | | 9/2001 | Duran et al. |
| 8,801,379 | B2 | * | 8/2014 | Allen .................... F04D 29/266 416/144 |
| 2002/0012578 | A1 | | 1/2002 | Duran et al. |

(Continued)

FOREIGN PATENT DOCUMENTS

DE 35 32 929 A1 3/1987
EP 1 683 942 A2 7/2006
(Continued)

*Primary Examiner* — Daniel S Larkin
(74) *Attorney, Agent, or Firm* — Oblon, McClelland, Maier & Neustadt, L.L.P.

(57) ABSTRACT

A balancing method for a rotating part device including a nut having an internal thread, and a countersunk collar is disclosed. The countersunk collar has a through-hole with a diameter greater than the diameter of the internal thread of the nut. The countersunk collar includes a balancing weight.

4 Claims, 5 Drawing Sheets

(56) References Cited

U.S. PATENT DOCUMENTS

| | | |
|---|---|---|
| 2004/0020216 A1 | 2/2004 | Wagner |
| 2004/0192452 A1 | 9/2004 | Brun |
| 2006/0073042 A1* | 4/2006 | Stewart ................. F04D 29/059 417/423.12 |
| 2008/0008556 A1 | 1/2008 | Dvorak |
| 2010/0119328 A1 | 5/2010 | Dai |

FOREIGN PATENT DOCUMENTS

| | | |
|---|---|---|
| EP | 1 717 481 A1 | 11/2006 |
| GB | 2 234 358 A | 1/1991 |
| GB | 2 265 964 A | 10/1993 |

\* cited by examiner

BALANCING DEVICE AND METHOD

CROSS-REFERENCE TO RELATED APPLICATIONS

This Application is a division of U.S. application Ser. No. 12/876,716 filed Sep. 7, 2010, now U.S. Pat. No. 9,017,016, the entire contents of which is incorporated herein by reference. U.S. application Ser. No. 12/876,716 is based upon and claims the benefit of priority to prior French Application No. 09 56119 filed Sep. 8, 2009.

The present invention relates to a device and a method for balancing rotating parts.

BACKGROUND OF THE INVENTION

Balancing rotating parts is a persistent problem in the field of engineering. When the center of gravity of a rotating part is displaced relative to the axis of rotation of the part, the centrifugal forces can cause the part to vibrate or, in extreme cases, to be destroyed. This problem is particularly critical in parts that rotate at a very high speed, such as, for example, the rotating shafts of turbine engines. Owing to their very high rotational speed, such rotating shafts must be balanced with a degree of precision greater than that permitted by the machining tolerances. To enable this balancing, such shafts conventionally comprise housings distributed radially around the shaft in order to accommodate balancing weights.

However, this solution has several disadvantages. Firstly, the machining of the housings and the fitting of the balancing weights mean additional manufacturing steps that increase the manufacturing costs. Secondly, the housings and the balancing weights increase the weight and the size of the shaft. When the rotating shaft is part of a turbine engine intended to propel an aircraft or a spacecraft, such an increase in the weight and the size is particularly undesirable.

An object of the present invention is thus to balance a rotating part more simply, whilst limiting the impact on the total weight and size.

DESCRIPTION OF THE PRIOR ART

It is common for rotating shafts such as, for example, turbine engine shafts, to be formed by a plurality of coaxial elements with radial flanges connected by series of bolts that pass through holes distributed radially about the axis of rotation. Each bolt has a partially threaded shank that engages with a nut bearing against a radial surface of a first radial flange. Said partially threaded shank passes through an axial hole in said first radial flange, and a substantially aligned axial hole in at least one other radial flange. On the opposite side to the nut, the bolt has a head for bearing against an outer surface of another radial flange and thus for fastening together the radial flanges through which the bolt passes.

In order to prevent damage to the inside of the holes in the radial flanges by contact with the thread of the bolt, the thread of the bolt begins only beyond the outer surface of the radial flange, the shank having a substantially smooth outer surface over a length greater than the total depth of the aligned holes through which this shank passes. However, so that the nut can bear on the outer surface of the radial flange of the coaxial element, a countersunk collar integral with the nut and having a through-hole with a diameter greater than the internal thread of the nut separates the internal thread of the nut from said outer surface, whilst transmitting the axial forces between the thread of the nut and the flange.

SUMMARY OF THE INVENTION

The present invention overcomes the abovementioned problem with a balancing device comprising a nut and a countersunk collar attached to said nut, said countersunk collar having a through-hole with a diameter greater than the diameter of the internal thread of the nut, and comprising a balancing weight. The incorporation of the balancing weight into said countersunk collar makes it possible to balance the rotating part, in other words to center its center of gravity on its axis of rotation, without having to create housings in the rotating part to accommodate separate balancing weights.

Said balancing weight can thus preferably be formed by a zone of the ring that can be machined without adversely affecting the capacity of the countersunk collar to transmit a predetermined axial load on the nut. The balancing weight can thus be reduced by machining in order to correctly balance the rotating part.

More preferably still, said balancing weight can be formed by a machinable outer radial thickness of the countersunk collar. The balancing weight can thus be reduced by removing material which according to an embodiment can be achieved by turning on a lathe some or all of this radial thickness. The removal of material can also be achieved, for example, by drilling radial bores in the collar or by cutting axial notches with the aid of a milling cutter, or by any other means of machining.

Said countersunk collar is preferably integrated with said nut. The nut and the balancing weight form a single piece, thus making it easier to mount and balance the rotating part.

According to another embodiment, said countersunk collar is in contact with said nut on a centering surface in order to keep the countersunk collar centered relative to a longitudinal axis of the thread of the nut. The nut and the countersunk collar can thus be separate pieces that are held together as a unit by the axial load of the nut when the nut is fastened.

Said nut can preferably have, on a side axially opposite said countersunk collar, a locking insert to prevent the nut from becoming unfastened.

The present invention also relates to a rotating part comprising at least one first radial flange in a plane substantially perpendicular to an axis of rotation of said part, said flange comprising a plurality of substantially axial holes distributed around said axis of rotation, and a plurality of bolts, the shank of which passes through one of these holes and is retained by a nut having an internal thread engaging with an external thread of the bolt, and a countersunk collar integral with the nut and having a through-hole with a diameter greater than the shank of the bolt, said countersunk collar being interposed between each nut and a radial surface of said flange, and at least two of said countersunk collars having substantially different weights.

Said countersunk collars can preferably have substantially equal lengths. The elasticity of the bolt-nut units is thus not affected.

Said rotating part can preferably comprise at least one other radial flange, having a plurality of axial holes substantially aligned with those of the first flange and through which pass the shanks of said bolts in such a way that said radial flanges are connected.

Said rotating part is preferably a rotating shaft. In particular, said rotating shaft is a rotating shaft of a turbine engine.

The present invention also relates to a method for balancing a rotating part comprising at least a first radial flange in a plane substantially perpendicular to an axis of rotation of said part, said flange comprising a plurality of substantially axial holes distributed around said axis of rotation, and a plurality of bolts, the shank of which passes through one of these holes and is retained by a nut having an internal thread engaging with an external thread of the bolt, and a countersunk collar integral with the nut and having a through-hole with a diameter greater than the shank of the bolt being interposed between each nut and a radial surface of said flange, the part being balanced by the use of at least two countersunk collars with different weights.

The weight of at least one of said two countersunk collars can be reduced by machining.

BRIEF DESCRIPTION OF THE DRAWINGS

Details concerning the invention are described below with reference to the drawings.

DESCRIPTION OF THE PREFERRED EMBODIMENTS

Figure 1:
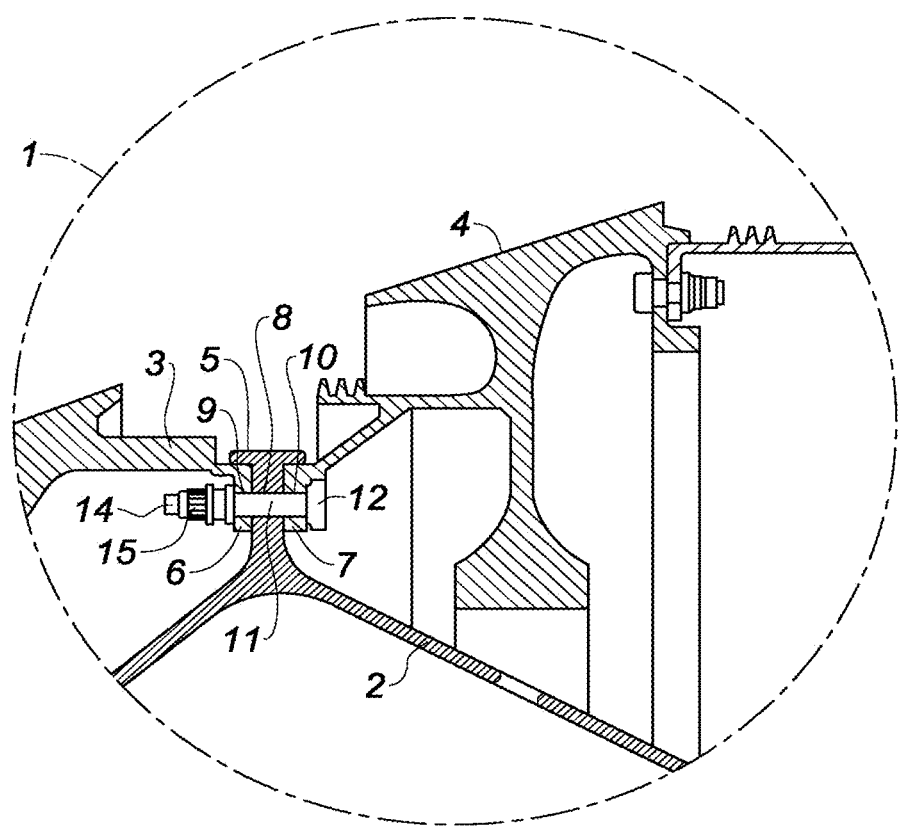
FIG. 1 shows a perspective view of a rotating part according to an embodiment of the invention.
Figure 2:
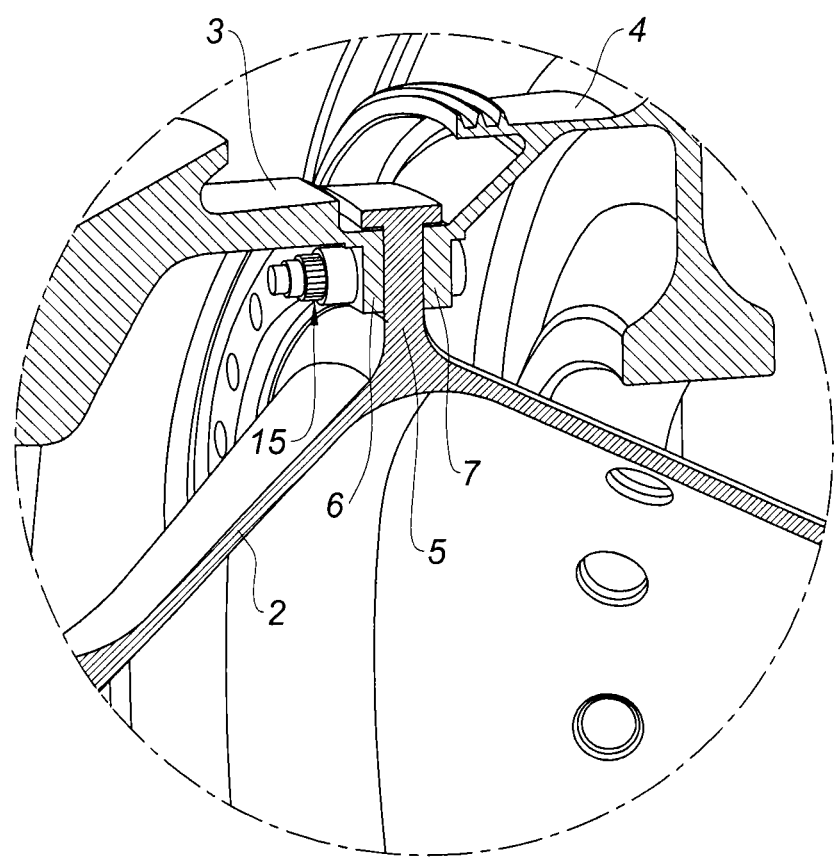
FIG. 2 shows a longitudinal cross-section of the rotating part in FIG. 1.

FIGS. 1 and 2 show a rotating part in the form of a rotating shaft 1 of a turbine engine, comprising three coaxial elements, including a central element 2 and two peripheral elements 3 and 4 designed to accommodate vanes. The three coaxial elements 2, 3 and 4 are connected by radial flanges 5, 6 and 7 respectively. Each radial flange 5, 6, 7 has a plurality of axial holes 8, 9 and 10 respectively that are distributed around the axis of rotation of the shaft 1. The holes 8, 9 and 10 in the three flanges 5, 6 and 7 are aligned and traversed by bolts 11 that fasten together the three flanges 5, 6, 7 in order to join the three coaxial elements 2, 3 and 4.

Figure 3:
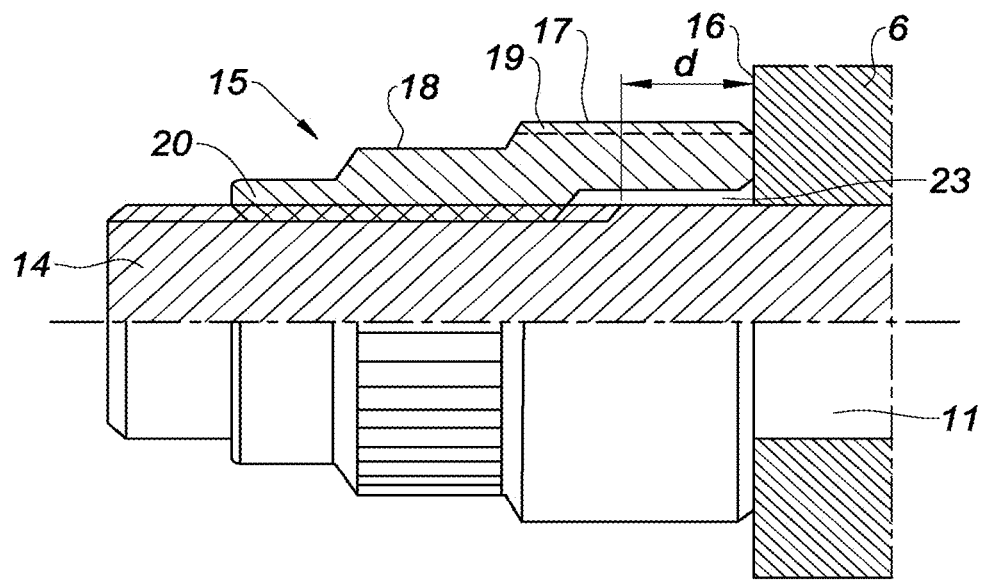
FIG. 3 shows a device for balancing the rotating part in FIG. 1.

Each bolt 11 has a head 12 bearing against an outer radial surface 13 of the flange 7, and a partially threaded shank 14, the external thread of which engages with the internal thread of a nut 15. As illustrated in FIG. 3, in order to prevent the thread of the bolt 11 coming into contact with the inner surface of the holes 8, 9 or 10 while the turbine engine is operating, which could damage them, the thread of the bolt 11 only begins a distance d beyond the outer radial surface 16 of the flange 6.

However, so that the nut 15 can bear against said surface 16, it comprises a countersunk collar 17 between its internal thread and the surface 16. Said countersunk collar 17 has a through-hole 23 with a greater diameter than the bolt 11.

Around the internal thread, the nut 15 comprises a chamfered surface 18 for fastening and unfastening the nut 15. However, the nut has an outer radial thickness 19 forming a balancing weight of 1.75 g on its countersunk collar 17. This thickness 19 can be partially or completely machined, for example by turning on a lathe, in order to modify this balancing weight.

On the side opposite the countersunk collar 17, the nut 15 also has a locking insert 20 for preventing the spontaneous unfastening of the nut 15. Such locking inserts, such as, for example, Nylstop® locking inserts, are well known to a person skilled in the art.

Figure 4A:
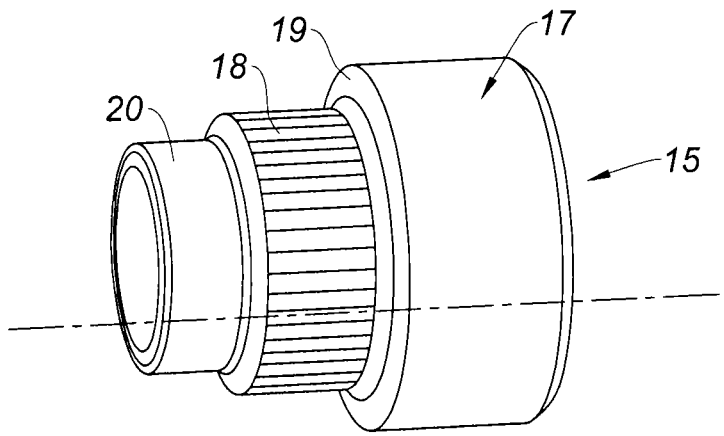
FIGS. 4A-4F show balancing devices such as that in FIG. 3 that have been partially or completely machined in order to reduce their balancing weights.
Figure 4B:
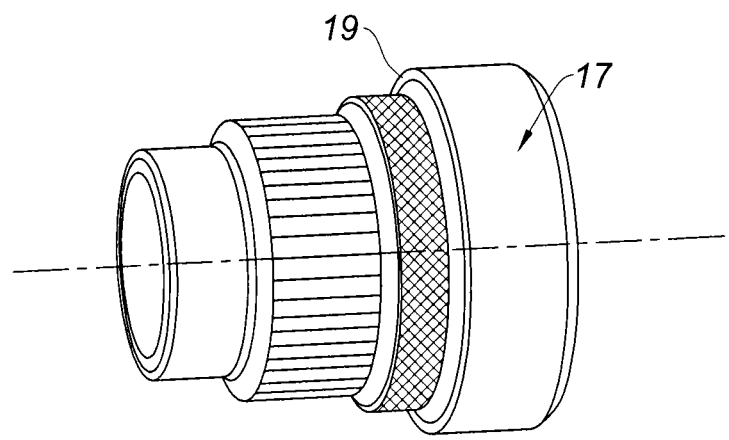
Figure 4C:
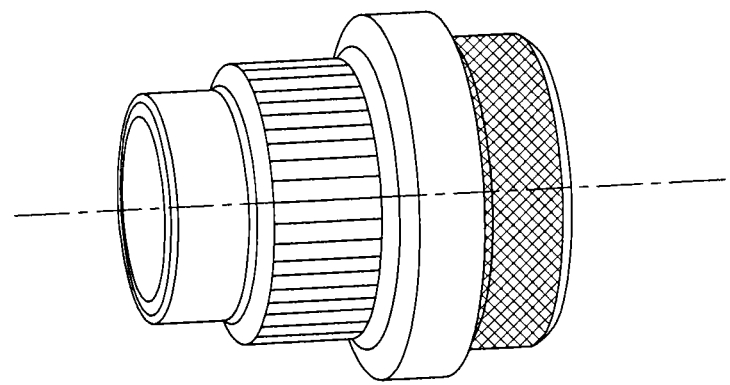
Figure 4D:
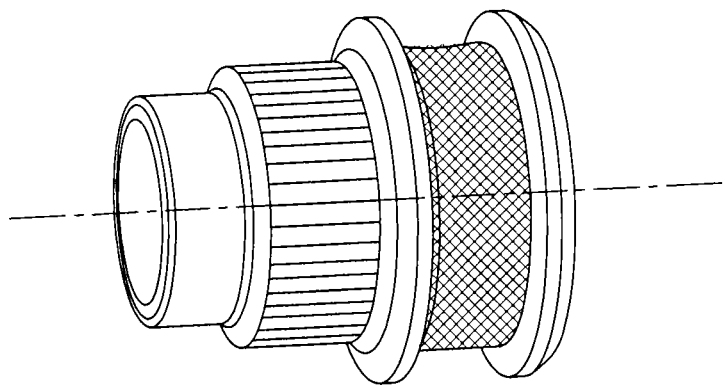
Figure 4E:
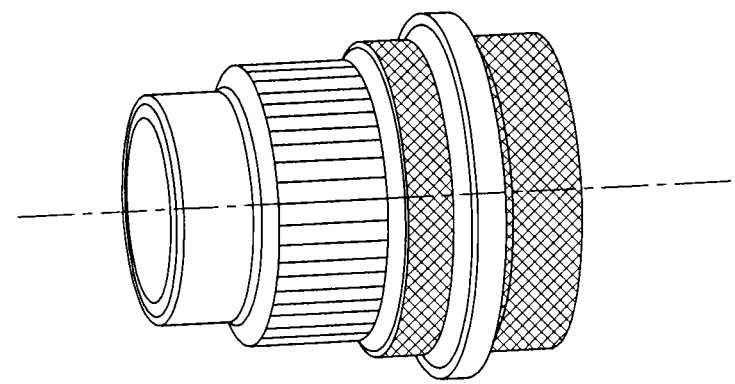
Figure 4F:
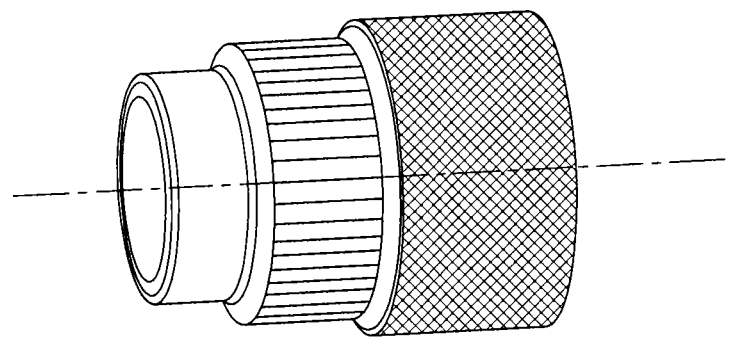

In FIGS. 4A-4F, the nut 15 is illustrated with different degrees of machining of the thickness 19 so as to obtain different balancing weights. Thus, in FIG. 4A, the thickness 19 is not machined and the total weight of the nut is 8 g. In FIG. 4B, the thickness 19 has been removed by machining along a length equal to two-sevenths of the length of the countersunk collar 17, thus reducing the total weight of the nut 15 to 7.5 g. In FIG. 4C, the thickness 19 has been removed along a length equal to four-sevenths of the length of the collar 17, reducing the total weight of the nut 15 to 7 g. In FIG. 4D, the thickness 19 has been removed along a length equal to five-sevenths of the length of the collar 17, reducing the total weight of the nut 15 to 6.75 g. In FIG. 4E, the thickness 19 has been removed along a length equal to six-sevenths of the length of the collar 17, reducing the total weight of the nut 15 to 6.5 g. Lastly, in FIG. 4F, the thickness 19 has been removed over the entire length of the collar 17, reducing the total weight of the nut 15 to 6.25 g. However, even when the thickness 19 has been completely removed, as illustrated in this last FIG. 4F, the remaining thickness of the countersunk collar 17 still allows a predetermined axial load to be transmitted after the nut 15 has been fastened.

In this way it is possible to obtain a set of nuts 15 with identical lengths and different weights. By varying the weight of each of the nuts 15 used to retain the bolts 11 connecting the flanges 5, 6 and 7, and hence the coaxial elements 2, 3 and 4 it is possible to balance the rotating shaft 1 about its axis of rotation.

Figure 5:
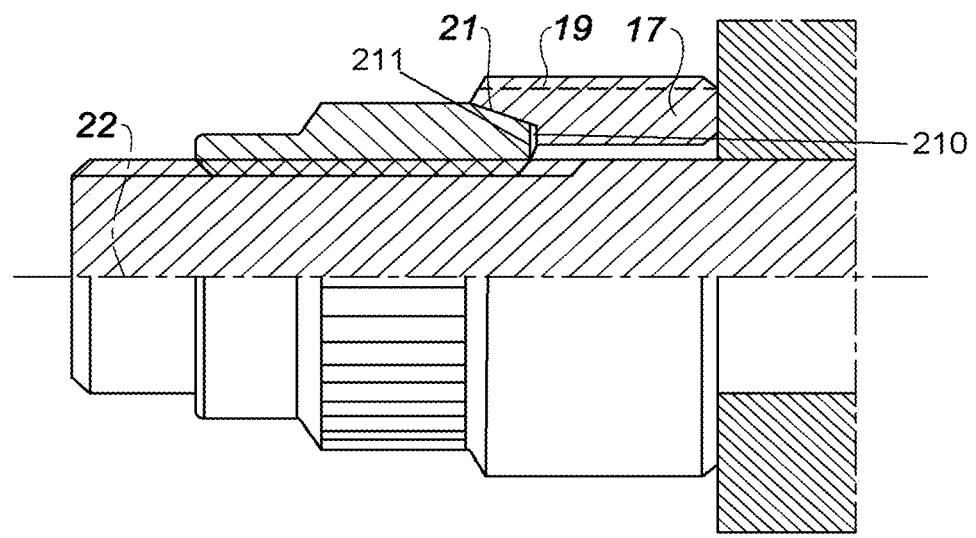
FIG. 5 shows an alternative embodiment of the balancing device in FIG. 3.

In an embodiment illustrated in FIG. 5, and identical to that in FIG. 3 in all other aspects, the countersunk collar 17 is not integrated with the nut 15 but forms a separate part. However, an end of the countersunk collar 17 includes a recess 210 including an inclined contact surface 21 and a radial surface 211 connecting an end of the inclined contact surface 21 to the through-hole. The inclined contact surface 21 between the nut 15 and the countersunk collar 17 effects the centering of the latter on the longitudinal axis 22 of the thread of the nut 15, in such a way that the two parts are integral when the nut 15 is fastened.

Although the present invention has been described with reference to specific embodiments, it is clear that different modifications and changes can be made to these examples without going beyond the general scope of the invention as defined in the claims. The description and the drawings must consequently be considered as being illustrative rather than restrictive.

The invention claimed is:

1. A method for balancing a rotating part comprising at a radial flange in a plane substantially perpendicular to an axis of rotation of said part, said radial flange comprising a plurality of substantially axial holes distributed around said axis of rotation, and a plurality of bolts, each bolt comprises a shank, the shank of each bolt passing through one of the holes and being retained by a nut having an internal thread engaging with an external thread of the shank, a countersunk collar attached to the nut and having a through-hole with a diameter greater than the shank being interposed between each nut and a radial surface of said flange, the method comprising:

providing a first nut with a first countersunk collar and a second nut with a second countersunk collar, the first and second nuts having a same weight;

determining an imbalance in the rotating part with the first nut on a first bolt and the second nut on a second bolt;

reducing the weight of the first countersunk collar relative to the second countersunk collar by machining of an outer radial thickness of said first countersunk collar; and engaging the first nut on the first bolt and engaging the second nut of the second bolt such that a center of gravity of the rotating part is centered on said axis of rotation, wherein, for each nut, the countersunk collar is separable from the nut, the countersunk collar includes a recess at an end thereof including an inclined centering surface and a radial surface connecting an end of the inclined centering surface and the through-hole, and the inclined centering surface of the countersunk collar contacts a corresponding inclined exterior surface of the nut in order to keep the countersunk collar centered relative to a longitudinal axis of the thread of the nut.

2. The method according to claim 1, wherein the providing includes providing the first nut and the second nut having equal lengths.

3. The method according to claim 1, wherein the providing includes providing the second nut with a total weight of 8 g.

4. The method according to claim 3, wherein the providing includes providing the second nut with the second countersunk collar with a weight of 1.75 g.

* * * * *